(12) United States Patent
McDonald

(10) Patent No.: US 8,832,418 B2
(45) Date of Patent: Sep. 9, 2014

(54) EFFICIENT BRANCH TARGET ADDRESS CACHE ENTRY REPLACEMENT

(75) Inventor: Thomas C. McDonald, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 944 days.

(21) Appl. No.: 12/575,951

(22) Filed: Oct. 8, 2009

(65) Prior Publication Data

US 2011/0055529 A1    Mar. 3, 2011

Related U.S. Application Data

(60) Provisional application No. 61/237,920, filed on Aug. 28, 2009.

(51) Int. Cl.
*G06F 9/38* (2006.01)
*G06F 9/30* (2006.01)

(52) U.S. Cl.
CPC .......... *G06F 9/3806* (2013.01); *G06F 9/30054* (2013.01)
USPC ............................................................. 712/239

(58) Field of Classification Search
CPC .................................................. G06F 9/3842
See application file for complete search history.

(56) References Cited

U.S. PATENT DOCUMENTS

| 5,752,069 A * | 5/1998 | Roberts et al. ............... 712/23 |
| 5,842,008 A * | 11/1998 | Gochman et al. ........... 712/240 |
| 5,943,687 A * | 8/1999 | Liedberg ...................... 711/156 |
| 6,895,498 B2 | 5/2005 | McDonald et al. |
| 8,195,886 B2 * | 6/2012 | Ozer et al. .................... 711/133 |
| 2008/0120496 A1 | 5/2008 | Bradford et al. |
| 2010/0228957 A1 * | 9/2010 | Rabinovitch et al. ......... 712/238 |

* cited by examiner

*Primary Examiner* — Andrew Caldwell
*Assistant Examiner* — John Lindlof
(74) *Attorney, Agent, or Firm* — E. Alan Davis; James W. Huffman; Eric W. Cernyar

(57) ABSTRACT

A microprocessor includes a branch target address cache (BTAC), each entry thereof configured to store branch prediction information for at most N branch instructions. An execution unit executes a branch instruction previously fetched in a fetch quantum. Update logic determines whether the BTAC is already storing information for N branch instructions within the fetch quantum (N is at least two), updates the BTAC for the branch instruction if the BTAC is not already storing information for N branch instructions, determines whether a type of the branch instruction has a higher replacement priority than a type of the N branch instructions if the BTAC is already storing information for N branch instructions, and updates the BTAC for the branch instruction if the type of the branch instruction has a higher replacement priority than the type of the N branch instructions already stored in the BTAC.

30 Claims, 3 Drawing Sheets

Fig. 2
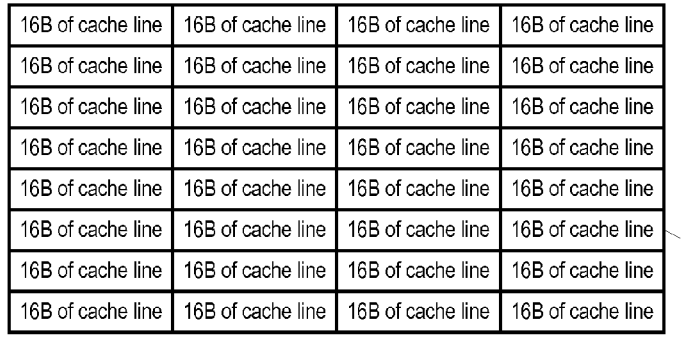
202 cache line
Fig. 3
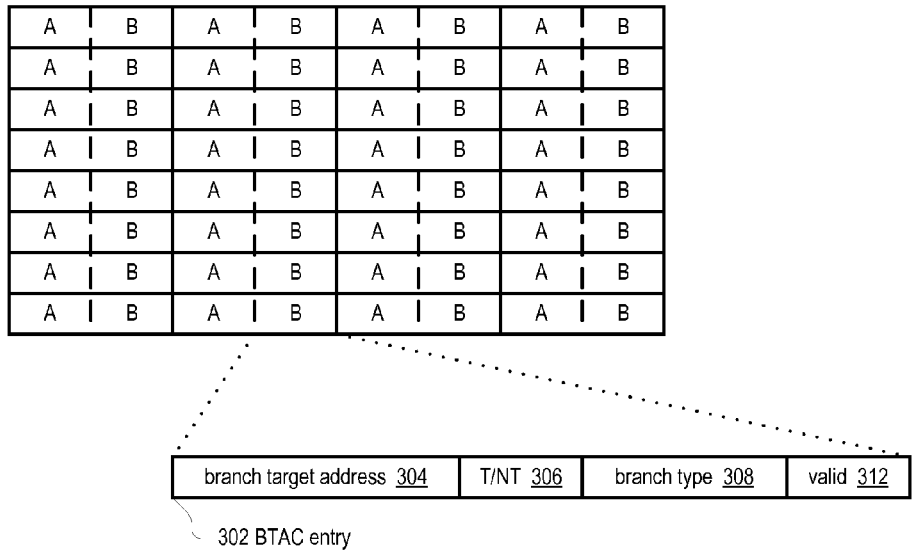
branch target address 304 | T/NT 306 | branch type 308 | valid 312
302 BTAC entry
Fig. 4
branch type priorities
1. indirect (highest priority)
2. CALL/RET
3. conditional relative
4. unconditional relative (lowest priority)

EFFICIENT BRANCH TARGET ADDRESS CACHE ENTRY REPLACEMENT

CROSS REFERENCE TO RELATED APPLICATION(S)

This application claims priority based on U.S. Provisional Application 61/237,920, filed Aug. 28, 2009, entitled EFFICIENT BRANCH TARGET ADDRESS CACHE ENTRY REPLACEMENT, which is hereby incorporated by reference in its entirety.

FIELD OF THE INVENTION

The present invention relates in general to the field of microprocessors, and particularly to branch target address caches therein.

BACKGROUND OF THE INVENTION

A conventional branch target address cache (BTAC) has a limitation of storing information about only two branch instructions in a given aligned 16-byte piece of instruction data. This design choice was made to improve timing considerations and to reduce power consumption and die size. Allowing three or four branches is significantly more complex than two. Although it is relatively rare to have three or more branches with their initial byte all in the same 16-byte fetch from the instruction cache, the situation does occur and can, therefore, have a negative impact on performance.

BRIEF SUMMARY OF INVENTION

In one aspect the present invention provides a microprocessor. The microprocessor includes a branch target address cache (BTAC). Each entry of the BTAC is configured to store branch prediction information for at most N branch instructions. The microprocessor also includes an execution unit, configured to execute a branch instruction previously fetched from an instruction cache in a fetch quantum. The microprocessor also includes update logic, coupled to the BTAC and execution unit. The update logic is configured to determine whether the BTAC is already storing branch prediction information for N branch instructions within the fetch quantum, wherein N is at least two. The update logic is also configured to update the BTAC with branch information for the branch instruction, if the BTAC is not already storing branch prediction information for N branch instructions within the fetch quantum. The update logic is also configured to determine whether a type of the branch instruction has a higher replacement priority than a type of the N branch instructions already stored in the BTAC, if the BTAC is already storing branch prediction information for N branch instructions within the fetch quantum. The update logic is also configured to update the BTAC with branch information for the branch instruction, if the type of the branch instruction has a higher replacement priority than the type of the N branch instructions already stored in the BTAC.

In another aspect, the present invention provides a method for updating a branch target address cache (BTAC) in a microprocessor using a BTAC replacement scheme based on branch instruction type priorities, wherein each entry of the BTAC is configured to store branch prediction information for at most N branch instructions within an associated fetch quantum from an instruction cache. The method includes executing a branch instruction previously fetched from the instruction cache in a fetch quantum. The method also includes determining whether the BTAC is already storing branch prediction information for N branch instructions within the fetch quantum, wherein N is at least two. The method also includes updating the BTAC with branch information for the branch instruction, if the BTAC is not already storing branch prediction information for N branch instructions within the fetch quantum. The method also includes determining whether a type of the branch instruction has a higher replacement priority than a type of the N branch instructions already stored in the BTAC, if the BTAC is already storing branch prediction information for N branch instructions within the fetch quantum. The method also includes updating the BTAC with branch information for the branch instruction, if the type of the branch instruction has a higher replacement priority than the type of the N branch instructions already stored in the BTAC.

In yet another aspect, the present invention provides a computer program product for use with a computing device, the computer program product comprising a computer usable storage medium having computer readable program code embodied in the medium for specifying a microprocessor. The computer readable program code includes first program code for specifying a branch target address cache (BTAC), wherein each entry of the BTAC is configured to store branch prediction information for at most N branch instructions. The computer readable program code also includes second program code for specifying an execution unit configured to execute a branch instruction previously fetched from an instruction cache in a fetch quantum. The computer readable program code also includes third program code for specifying update logic, coupled to the BTAC and execution unit. The update logic is configured to determine whether the BTAC is already storing branch prediction information for N branch instructions within the fetch quantum, wherein N is at least two. The update logic is also configured to update the BTAC with branch information for the branch instruction, if the BTAC is not already storing branch prediction information for N branch instructions within the fetch quantum. The update logic is also configured to determine whether a type of the branch instruction has a higher replacement priority than a type of the N branch instructions already stored in the BTAC, if the BTAC is already storing branch prediction information for N branch instructions within the fetch quantum. The update logic is also configured to update the BTAC with branch information for the branch instruction, if the type of the branch instruction has a higher replacement priority than the type of the N branch instructions already stored in the BTAC.

BRIEF DESCRIPTION OF THE DRAWINGS

FIG. 2 is a block diagram illustrating an instruction cache from which are fetched cache lines in portions.

FIG. 3 is a block diagram illustrating the arrangement of the BTAC of FIG. 1.

FIG. 4 is a block diagram illustrating the branch type priority structure employed by the BTAC update logic of FIG. 1.

DETAILED DESCRIPTION OF THE INVENTION

In order to minimize the performance hit caused by the problem described above, embodiments are described herein that employ a replacement policy for the situation where an additional branch instruction (e.g., a third branch) is seen in the same portion, or quantum, e.g., 16-bytes, of a cache line fetched from an instruction cache. The replacement policy is a priority scheme based on the type of branches involved, with a pseudo-random provision for overriding the priority scheme to accommodate corner cases.

Figure 1:
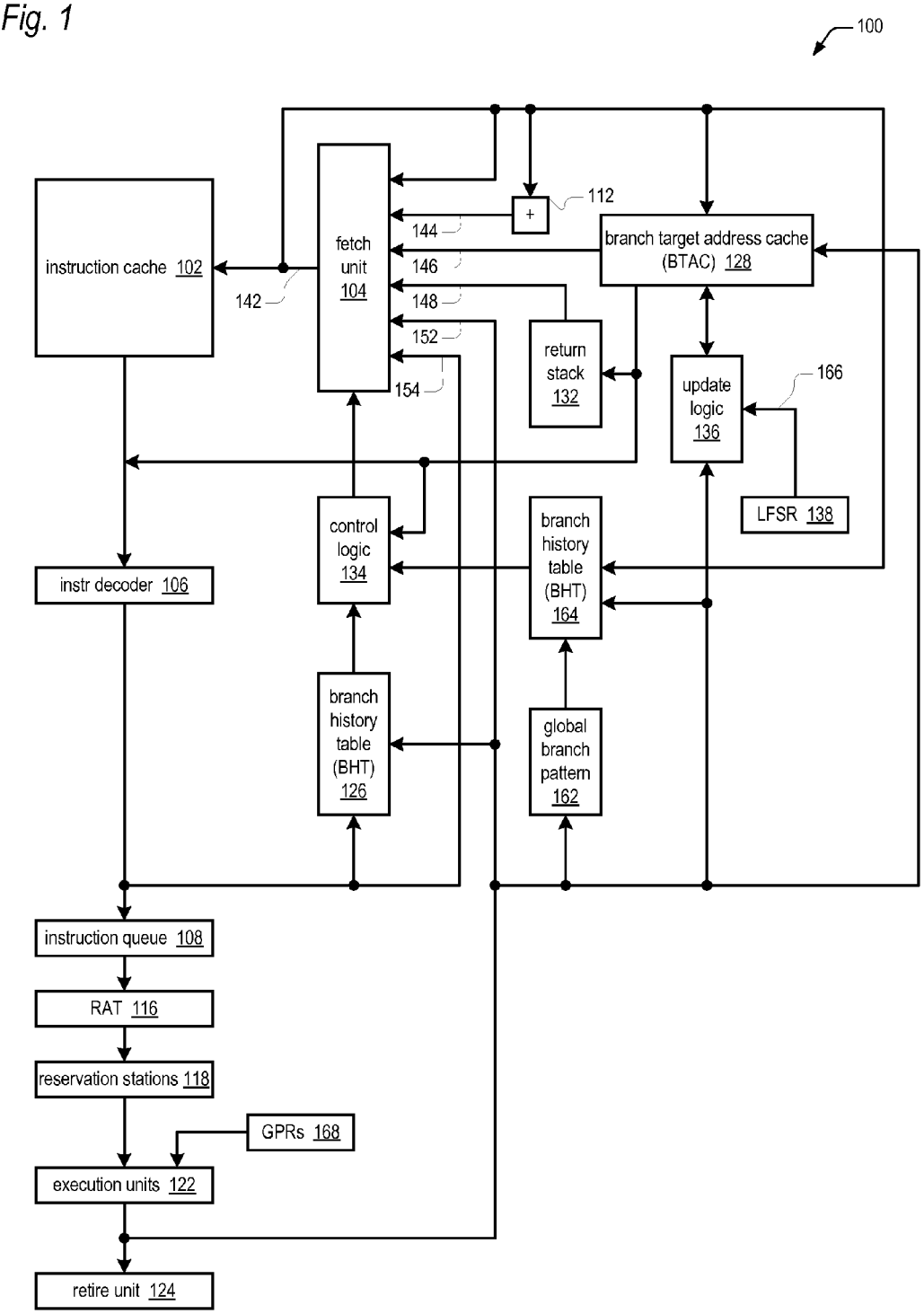
FIG. 1 is a block diagram illustrating a microprocessor according to the present invention.

Referring now to FIG. 1, a block diagram illustrating a microprocessor 100 according to the present invention is shown. The microprocessor 100 includes an instruction cache 102 that is accessed by a fetch address 142 provided by a fetch unit 104. The fetch unit outputs the fetch address 142 value by selecting one of a plurality of addresses provided by various sources, which include: the fetch address 142 itself; the next sequential fetch address 144 provided by an adder 112 that increments the fetch address 142; a predicted branch target address 146 provided by a branch target address cache (BTAC) 128; a predicted return address 148 provided by a return stack 132; a correct target address 152 provided by an execution unit 122; and a branch target address 154 provided by an instruction decoder 106. Control logic 134 controls the fetch unit 104 to select one of the inputs based on a direction prediction from a first branch history table 164, a direction prediction from a second branch history table 126, and information from the BTAC 128, such as a direction prediction and type of the branch instruction predicted (e.g., call/return, indirect branch, conditional relative, unconditional relative).

In response to the fetch address 142, the instruction cache 102 provides a cache line of instruction bytes to an instruction decoder 106. The instruction cache 102 provides a portion of the cache line per clock cycle, rather than the entire cache line. In one embodiment, as shown in FIG. 2, each cache line 202 is 64 bytes, and the instruction cache 102 provides a 16 byte portion to the instruction decoder 106 (or instruction buffer, not shown) each clock cycle. The instruction decoder 106 decodes the instruction bytes. In one embodiment, the instruction decoder 106 translates x86 architecture instructions into microinstructions that are provided to an instruction queue 108. When the instruction decoder 106 decodes a branch instruction whose target address may be computed as an offset relative to the address of the branch instruction, the instruction decoder 106 calculates the target address 154 and provides it to the fetch unit 104. Additionally, the instruction decoder 106 provides the address of the branch instruction to a branch history table 126. The branch history table 126 stores direction history information about previously executed branch instructions. If the branch instruction address hits in the branch history table 126, it provides a prediction of whether the branch will be taken to the control logic 134. The control logic 134 uses the prediction to control the fetch unit 104.

The instruction queue 108 provides the instructions in program order to a register alias table (RAT) 116 that maintains and generates dependency information for each instruction. The RAT 116 dispatches the instructions to reservation stations 118 that issue the instructions, potentially out of program order, to execution units 122. The execution units 122 execute branch instructions. The execution units 122 also indicate whether the various branch predictors (BTAC 128, return stack 132, branch history table 126, and branch history table 164) have correctly predicted the branch instruction. The execution units 122 also update the various branch predictors with history information based on the execution of the branch instruction. The execution units 122 also provide the correct target address 152 to the fetch unit 104. The execution units 122 also update a global branch pattern 162 stored by the microprocessor 100 that is used by the branch history table 164 to make its direction prediction when the fetch address 142 hits in the branch history table 164. After the instructions are executed by the execution units 122, a retire unit 124 retires the instructions in program order, which is maintained by a reorder buffer (not shown).

Referring now to FIG. 3, a block diagram illustrating the arrangement of the BTAC 128 of FIG. 1 is shown. The BTAC 128 holds information about previously executed branch instructions that it uses to predict their target address, direction, and type during subsequent executions. As shown in FIG. 3, each entry 302 in the BTAC 128 includes a valid bit 312, a branch target address prediction 304, a direction prediction 306 (i.e., whether the branch instruction will be taken or not taken), and a branch type 308, which in one embodiment specifies whether the branch instruction is a call/return, indirect branch, conditional relative branch, or unconditional relative branch. Advantageously, update logic 136 of the microprocessor 100 uses the branch type information 308 to intelligently perform replacement of entries 302 in the BTAC 128, as described in more detail below. As shown in FIG. 3, for each portion, or fetch quantum, of a cache line of the instruction cache 102 (e.g., 16 bytes), the BTAC 128 can hold two entries 302, denoted "A" and "B"; that is, the BTAC 128 can hold prediction information for up to two branch instructions that may be present in a portion of the cache line. As discussed above, this limitation is detrimental to branch prediction performance in cases where there are more than two branch instructions in a portion of a cache line. However, advantageously, the update logic 136 employs an intelligent replacement policy to reduce the performance impact, as described in detail below. In one embodiment, the BTAC 128 also include a least-recently-used (LRU) bit (not shown) for each A/B entry pairs to indicate which of the A or B side was least recently used to be used in determining whether to replace the A or B entry 302. Although embodiments are described here in which prediction information for two branch instructions are stored in the BTAC 128 per 16 byte portion of a cache line of instruction data, other embodiments are contemplated, i.e., the size of the portion of the instruction cache and the number of branch instructions per portion may vary to meet design needs.

Referring again to FIG. 1, when the fetch address 142 hits in the BTAC 128, the BTAC 128 provides the information to the fetch unit 104, instruction decoder 106, return stack 132, and control logic 134. In particular, the BTAC 128 provides the branch target address 304 as predicted target address 146 to the fetch unit 104 and provides the direction prediction 306 and branch type 308 to the control logic 134. Additionally, the branch type 308 is provided down the pipeline with the branch instruction, and the execution units 122 later provide the branch type 308 to the update logic 136 for use in the BTAC 128 replacement policy, as described below in more detail.

The return stack 132 stores return addresses generated by call instructions. When the BTAC 128 indicates that the portion of the cache line specified by the fetch address 142 contains a call instruction, the return stack 132 is populated with a return address. When the BTAC 128 indicates that the portion of the cache line specified by the fetch address 142 contains a return instruction, the return stack 132 provides the return address 148 to the fetch unit 104.

The microprocessor 100 also includes a pseudo-random generator 138 that provides a pseudo-random indicator 166 to the update logic 136. The update logic 136 advantageously uses the pseudo-random indicator 166 to implement the BTAC 128 replacement policy to improve a strictly priority-based replacement policy, as described in more detail below.

In one embodiment, the pseudo-random generator 138 is a 15-bit linear feedback shift register (LFSR) that cycles through all of the 2^15 states (except all zeroes) in pseudo-random order, and the number of clock cycles before pseudo-random generator 138 generates the same generation pattern repeats is 32767 clock cycles. When needed, a 5-bit sample is taken of the 15 bits to generate a pseudo-random indicator 166. Consequently, the pseudo-random indicator 166 is true on average approximately once every 32 clock cycles.

Referring now to FIG. 4, a block diagram illustrating the branch type priority structure employed by the BTAC update logic 136 of FIG. 1 is shown. In the embodiment of FIG. 4, indirect type branch instructions have the highest priority for not being replaced; call/return type branch instructions have the next highest priority; conditional relative type branch instructions have the next highest priority; and unconditional relative type branch instructions have the lowest priority for not being replaced.

A relative type branch instruction is one whose target address may be calculated as the sum of an offset relative to the address of the branch instruction, and the offset is provided as a field within the instruction itself. Consequently, the instruction decoder 106 can correctly calculate the target address 154 of a relative branch instruction type, which includes conditional relative branch instructions and unconditional relative branch instructions. Furthermore, for unconditional branch instructions the direction is known; therefore, the instruction decoder 106 can accurately resolve unconditional relative branch instructions. Consequently, the penalty associated with the BTAC 128 mispredicting an unconditional relative branch instruction is relatively smaller than the other types of branch instructions. In one embodiment, the penalty will be approximately seven clock cycles in the worst case, but may be less depending upon the fullness of the instruction queue 108. This is why unconditional relative branch instructions are lowest priority for not being replaced. In one embodiment, the BTAC 128 entry includes a flag to indicate whether the branch instruction is an unconditional relative branch instruction, such that if there are more than two branch instructions in a cache line portion, the update logic 136 replaces the unconditional relative branch instruction in the BTAC 128, and the update logic 136 generally does not replace other types of branch instructions with an unconditional relative branch instruction.

In contrast to relative type branch instructions, some of the operands used to calculate an indirect type branch instruction target address are provided from operands in general purpose registers 168 of the microprocessor 100 or from memory locations. Consequently, the instruction decoder 106 does not predict indirect branch instructions, and indirect branch instruction target addresses are calculated by the execution units 122. Therefore, the penalty associated with the BTAC 128 mispredicting an indirect branch instruction is typically larger than the penalty associated with the BTAC 128 mispredicting the other types of branch instructions. This is why indirect branch instructions are highest priority for not being replaced.

Furthermore, replacing a call/return instruction in the BTAC 128 that has a valid return address in the return stack 132 will cause the return stack 132 to be misaligned, creating a high likelihood that the return stack 132 will subsequently mispredict, which has a negative performance impact. This is why call/return instructions have highest priority after indirect branch instructions for not being replaced.

Finally, although conditional relative branch instructions are predicted by the instruction decoder 106 (target address) and branch history table 126 (direction) as well as by the BTAC 128, the BTAC 128 direction prediction is more accurate since in one embodiment the BTAC 128 is larger than the branch history table 126. Furthermore, removing a conditional relative branch instruction from the BTAC 128 can cause the global branch pattern 162 to be incorrect. For these reasons, conditional relative branch instructions are also BTAC-preferred and prioritized above unconditional relative branch instructions.

Figure 5:
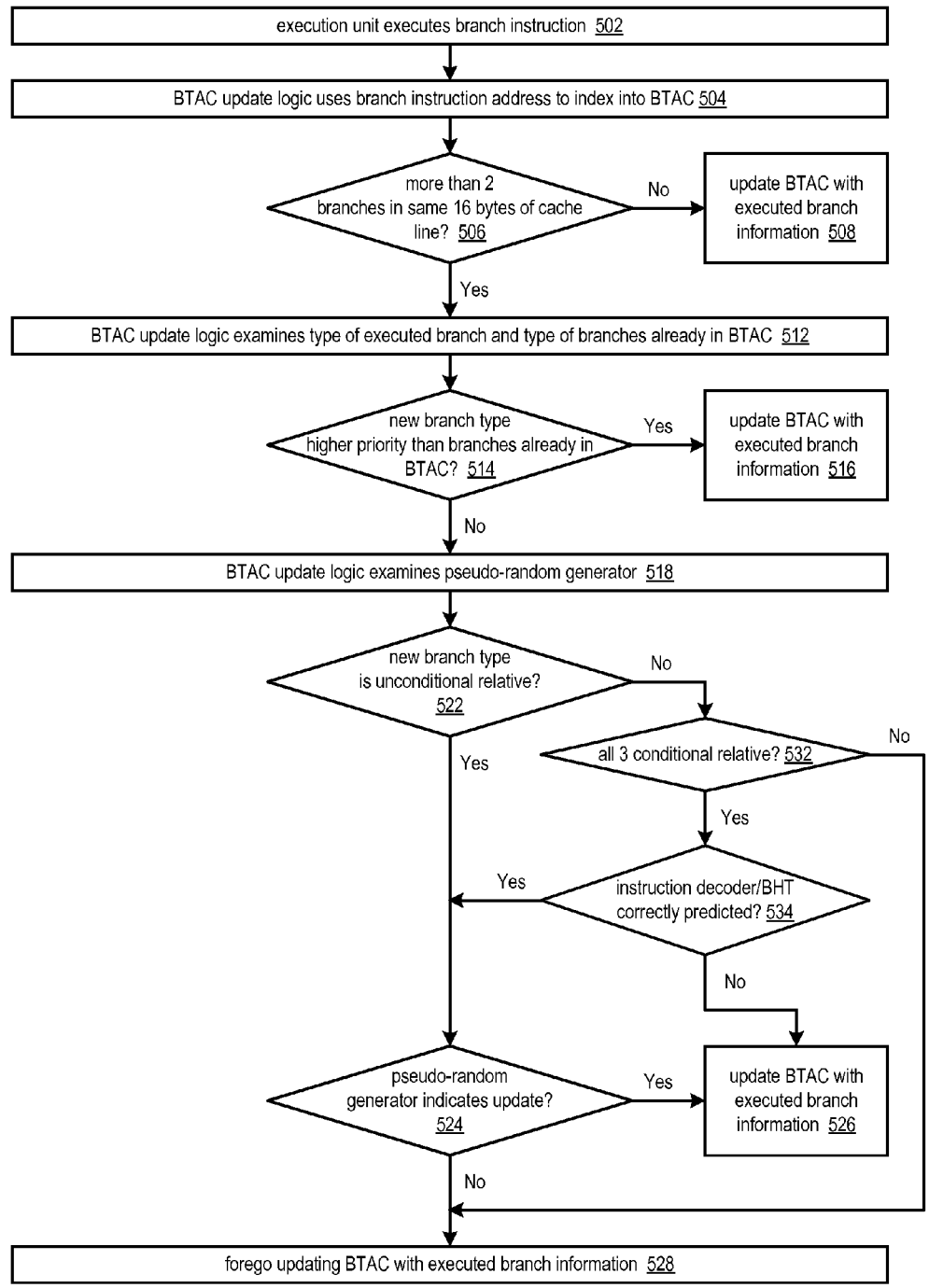
FIG. 5 is a flowchart illustrating operation of the microprocessor of FIG. 1.

Referring now to FIG. 5, a flowchart illustrating operation of the microprocessor 100 of FIG. 1 is shown. Flow begins at block 502.

At block 502, the execution unit 122 executes a new branch instruction and provides the relevant information to the update logic 136. Flow proceeds to block 504.

At block 504, the update logic 136 uses the new branch instruction address to index into the BTAC 128. Flow proceeds to decision block 506.

At decision block 506, the update logic 136 examines the A and B entry 302 valid bits 312 to determine whether there are more than two branch instructions in the same portion of the cache line. If so, flow proceeds to block 512; otherwise, flow proceeds to block 508.

At block 508, the update logic 136 updates the BTAC 128 with the execution information associated with the new branch instruction. That is, the update logic 136 writes the invalid A or B entry 302. Flow ends at block 508.

At block 512, the update logic 136 examines the branch type of the new branch instruction (provided by the execution unit 122) and the branch type 308 of the two valid branch instructions in the A and B entries 302 (provided either from the BTAC 128 or from the execution unit 122, according to different embodiments). Flow proceeds to decision block 514.

At decision block 514, the update logic 136 determines whether the type of the new branch instruction is higher priority than the two valid branch instructions in the A and B entries 302. If so, flow proceeds to block 516; otherwise, flow proceeds to block 518.

At block 516, the update logic 136 updates the BTAC 128 with the execution information associated with the new branch instruction. That is, the update logic 136 replaces one of the two valid branch instructions in either the A or B entry 302. In one embodiment, the update logic 136 selects the A or B entry 302 of the indexed set and selected way based on the LRU bit described above. Flow ends at block 516.

Referring now to block 518, the update logic 136 examines the pseudo-random indicator 166. Flow proceeds to decision block 522.

At decision block 522, the update logic 136 determines whether the new branch instruction is an unconditional relative type. If so, flow proceeds to decision block 524; otherwise, flow proceeds to decision block 532.

At decision block 524, the update logic 136 examines the pseudo-random indicator 166 and if it is true, flow proceeds to block 526; otherwise, flow proceeds to block 528.

At block 526, the update logic 136 updates the BTAC 128 with the branch information of the newly executed branch instruction. Flow ends at block 526.

At block 528, the update logic 136 foregoes updating the BTAC 128 in response to the newly executed branch instruction. Flow ends at block 528.

At decision block 532, the update logic 136 determines whether all three branch instructions (i.e., the newly executed branch instruction and the two branch instructions occupying the A and B entries 302) are conditional relative branch instructions. If so, flow proceeds to decision block 534; otherwise, flow proceeds to block 528.

At decision block 534, the update logic 136 determines whether instruction decoder 106/branch history table 126 correctly predicted the newly executed branch instruction. If so, flow proceeds to decision block 524; otherwise, flow proceeds to block 526.

The present inventor has observed that in cases where there are three branch instructions in a cache line portion, sometimes programs execute their instructions in a sequence such that all three of the branch instructions are repeatedly being executed and therefore potentially replacing another branch instruction in the BTAC 128; however, only two (or perhaps one) of the three branches is being executed most of the time. This may affect the performance of the strictly priority-based replacement policy embodied in blocks 502 through 516 above. For example, assume a program has an outer loop that includes a conditional relative branch (e.g., x86 JCC) followed by an inner loop that includes a second JCC followed by an unconditional relative branch (e.g., x86 JMP). In this situation, it is generally desirable to have the branches that are within the inner loop (i.e., the second JCC and the JMP) in the two BTAC entries, rather than the branch in the outer loop (i.e., the first JCC). However, because a JCC is higher priority than a JMP, according to the strict type priority replacement policy the two BTAC 128 entries would get populated with the two JCCs and the update logic 136 would never replace either of the JCCs with the JMP, which is undesirable.

To improve the performance, the pseudo-random generator 138 provides the pseudo-random indicator 166 to the update logic 136 for use as described with respect to blocks 518 through 528 above. It is noted that the pseudo-random indicator 166 is regular with respect to the microprocessor 100 clock cycle, which makes it relatively random with respect to the execution of branch instructions since for most programs the execution of a given branch instruction is relatively random with respect to the clock cycle. Thus, in the example above and assuming the pseudo-random indicator 166 is true once each approximately 32 clock cycles, the replacement policy according to blocks 518 through 528 will cause the update logic 136 to replace the JCC in the outer loop with the inner loop JMP typically within its thirty-second execution instance, and the inner loop JMP will remain in the BTAC 128 until the outer loop JCC gets executed again.

Additionally, if there are three JCC instructions in a given cache portion, the update logic 136 checks to see if the instruction decoder 106/branch history table 126 correctly predicted the JCC, and if it did, generally refrains from replacing one of the other two JCC instructions, according to blocks 532/534/528. This is because it is desirable to keep the hard-to-predict JCCs in the BTAC 128 where the most accurate direction prediction occurs (because, in one embodiment, the branch history table 126 is smaller and uses a simpler algorithm than the BTAC 128 and branch history table 164). However, to avoid a situation similar to the one described above, in which two of the JCCs are being seen often, and one of the three JCCs is rarely executed, the update logic 136 will allow the well-behaved JCC (i.e., the JCC in the inner loop that is correctly predicted by the instruction decoder 106/branch history table 126) to go ahead and replace one of the other JCCs typically within its thirty-second execution instance, according to blocks 532/534/526.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A microprocessor, comprising:
a branch target address cache (BTAC), wherein each entry of the BTAC is configured to store branch prediction information and the BTAC is organized into multiple groups of N entries so that each group provides N entries for storing branch prediction information for N branch instructions per fetch quantum, wherein N is a constant integer value, N is at least two, and branch instructions are classified with replacement priorities that are based on branch instruction type; and
an execution unit, configured to execute a new branch instruction previously fetched from an instruction cache in a fetch quantum;
an override indicator that regularly, approximately X of every Y clock cycles, provides an indication to force an update of the BTAC with branch information for a branch instruction, wherein Y is greater than X; and
update logic, coupled to the BTAC and execution unit, configured to:
determine whether the BTAC is already storing branch prediction information for N branch instructions within the fetch quantum;
update the BTAC with branch information for the new branch instruction, if the BTAC is not already storing branch prediction information for N branch instructions within the fetch quantum;
determine whether the new branch instruction has a higher replacement priority, based on its type, than the branch instructions whose branch prediction information are already stored in the BTAC, if the BTAC is already storing branch prediction information for N branch instructions within the fetch quantum;
update the BTAC with branch information for the new branch instruction, if the new branch instruction has a higher replacement priority, based on its type, than the branch instructions whose branch prediction information are already stored in the BTAC; and
forego updating the BTAC with branch information for the new branch instruction, if the new branch instruction does not have a higher replacement priority, based on its type, than the branch instructions whose prediction information are already stored in the BTAC, unless the override indicator provides an override indication to force an update of the BTAC.

2. The microprocessor of claim 1, wherein an indirect type branch instruction has a higher replacement priority than an unconditional relative type branch instruction.

3. The microprocessor of claim 1, wherein an indirect type branch instruction has a higher replacement priority than a conditional relative type branch instruction.

4. The microprocessor of claim 1, wherein an indirect type branch instruction has a higher replacement priority than a call/return type branch instruction.

5. The microprocessor of claim 1, wherein a call/return type branch instruction has a higher replacement priority than an unconditional relative type branch instruction.

6. The microprocessor of claim 1, wherein a call/return type branch instruction has a higher replacement priority than a conditional relative type branch instruction.

7. The microprocessor of claim 1, wherein a conditional relative branch instruction has a higher replacement priority than an unconditional relative type branch instruction.

8. The microprocessor of claim 1, wherein an indirect type branch instruction has a higher replacement priority than a call/return type branch instruction, and a call/return type branch instruction has a higher replacement priority than a conditional relative type branch instruction, and a conditional relative type branch instruction has a higher replacement priority than an unconditional relative type branch instruction.

9. The microprocessor of claim 1, wherein an unconditional relative type branch instruction has a lower replacement priority than any other branch instruction type.

10. The microprocessor of claim 1, further comprising:
a pseudo-random generator, coupled to the update logic, configured to generate the override indicator;
wherein the update logic is further configured to:
determine whether the override indicator is true, if the new branch instruction does not have a higher replacement priority, based on its type, than the branch instructions whose branch prediction information are already stored in the BTAC;
update the BTAC with branch information for the new branch instruction, if the override indicator is true; and
forego updating the BTAC with branch information for the new branch instruction, if the override indicator is false.

11. The microprocessor of claim 10, wherein the pseudo-random generator comprises a linear feedback shift register.

12. The microprocessor of claim 1, wherein the override indicator is a pseudo-random indicator and the update logic is further configured to:
determine whether the new branch instruction is an unconditional relative type, if the new branch instruction does not have a higher replacement priority, based on its type, than the branch instructions whose branch prediction information are already stored in the BTAC;
determine whether the pseudo-random indicator is true, if the new branch instruction is an unconditional relative type;
update the BTAC with branch information for the new branch instruction, if the pseudo-random indicator is true; and
forego updating the BTAC with branch information for the new branch instruction, if the pseudo-random indicator is false.

13. The microprocessor of claim 12, the update logic is further configured to:
determine whether the branch instructions whose branch prediction information are already stored in the BTAC are all a conditional relative type, if the new branch instruction is not an unconditional relative type; and
forego updating the BTAC with branch information for the new branch instruction, if the new branch instruction and branch instructions whose branch prediction information are already stored in the BTAC are not all a conditional relative type.

14. The microprocessor of claim 13, further comprising:
an instruction decode-based branch predictor, configured to predict the new branch instruction based on decoding thereof, wherein the BTAC is a non-decode, fetch address-based branch predictor;
wherein the update logic is further configured to:
determine whether the instruction decode-based branch predictor correctly predicted the branch instruction, if the new branch instruction and the branch instructions whose branch prediction information are already stored in the BTAC are all a conditional relative type;
update the BTAC with branch information for the new branch instruction, if the instruction decode-based branch predictor did not correctly predict the branch instruction or the pseudo-random indicator is true; and
otherwise, foregoing updating the BTAC with branch information for the new branch instruction.

15. The microprocessor of claim 1, wherein the fetch quantum is at least sixteen bytes.

16. A method for updating a branch target address cache (BTAC) in a microprocessor using a BTAC replacement scheme based on branch instruction type priorities, wherein each entry of the BTAC is configured to store branch prediction information and the BTAC is organized into multiple groups of N entries, so that each group provides N entries for storing branch prediction information for N branch instructions per fetch quantum, wherein N is a constant integer value, N is at least two, and branch instructions are classified with replacement priorities that are based on branch instruction type, the method comprising:
executing a new branch instruction previously fetched from an instruction cache in a fetch quantum;
determining whether the BTAC is already storing branch prediction information for N branch instructions within the fetch quantum;
updating the BTAC with branch information for the new branch instruction, if the BTAC is not already storing branch prediction information for N branch instructions within the fetch quantum;
determining whether the new branch instruction has a higher replacement priority, based on its type, than the branch instructions whose branch prediction information are already stored in the BTAC, if the BTAC is already storing branch prediction information for N branch instructions within the fetch quantum;
updating the BTAC with branch information for the new branch instruction, if the new branch instruction has a higher replacement priority, based on its type, than the branch instructions whose branch prediction information are already stored in the BTAC; and
forego updating the BTAC with branch information for the new branch instruction, if the new branch instruction does not have a higher replacement priority, based on its type, than the branch instructions whose prediction information are already stored in the BTAC, unless an override indicator provides an override indication to force an update of the BTAC;
wherein the microprocessor includes an override indicator that regularly, approximately X of every Y clock cycles, provides an indication to force an update of the BTAC with branch information for a branch instruction, wherein Y is greater than X.

17. The method of claim 16, wherein an indirect type branch instruction has a higher replacement priority than an unconditional relative type branch instruction.

18. The method of claim 16, wherein an indirect type branch instruction has a higher replacement priority than a conditional relative type branch instruction.

19. The method of claim 16, wherein an indirect type branch instruction has a higher replacement priority than a call/return type branch instruction.

20. The method of claim 16, wherein a call/return type branch instruction has a higher replacement priority than an unconditional relative type branch instruction.

21. The method of claim 16, wherein a call/return type branch instruction has a higher replacement priority than a conditional relative type branch instruction.

22. The method of claim 16, wherein a conditional relative branch instruction has a higher replacement priority than an unconditional relative type branch instruction.

23. The method of claim 16, wherein an indirect type branch instruction has a higher replacement priority than a call/return type branch instruction, and a call/return type branch instruction has a higher replacement priority than a conditional relative type branch instruction, and a conditional relative type branch instruction has a higher replacement priority than an unconditional relative type branch instruction.

24. The method of claim 16, wherein an unconditional relative type branch instruction has a lower replacement priority than any other branch instruction type.

25. The method of claim 16, wherein the override indicator is a pseudo-random indicator, the method further comprising:
determining whether the pseudo-random indicator is true, if the new branch instruction does not have a higher replacement priority, based on its type, than the branch instructions whose branch prediction information are already stored in the BTAC;
updating the BTAC with branch information for the new branch instruction, if the pseudo-random indicator is true; and
foregoing updating the BTAC with branch information for the new branch instruction, if the pseudo-random indicator is false.

26. The method of claim 16, further comprising:
determining whether the new branch instruction is an unconditional relative type, if new branch instruction does not have a higher replacement priority, based on its type, than the branch instructions whose branch prediction information are already stored in the BTAC;
determining whether the pseudo-random indicator is true, if the new branch instruction is an unconditional relative type;
updating the BTAC with branch information for the new branch instruction, if the pseudo-random indicator is true; and
foregoing updating the BTAC with branch information for the new branch instruction, if the pseudo-random indicator is false.

27. The method of claim 26, further comprising:
determining whether the branch instructions whose branch prediction information are already stored in the BTAC are all a conditional relative type, if the new branch instruction is not an unconditional relative type; and
foregoing updating the BTAC with branch information for the new branch instruction, if the new branch instruction and branch instructions whose branch prediction information are already stored in the BTAC are not all a conditional relative type.

28. The method of claim 27, further comprising:
determining whether an instruction decode-based branch predictor correctly predicted the branch instruction, if the new branch instruction and the branch instructions whose branch prediction information are already stored in the BTAC are all a conditional relative type, wherein the BTAC is a non-decode, instruction fetch address-based branch predictor,
updating the BTAC with branch information for the new branch instruction, if the instruction decode-based branch predictor did not correctly predict the branch instruction or the pseudo-random indicator is true; and
otherwise, foregoing updating the BTAC with branch information for the new branch instruction.

29. The method of claim 16, wherein the fetch quantum is at least sixteen bytes.

30. A computer program product for use with a computing device, the computer program product comprising:
a non-transitory computer usable storage medium, having computer readable program code embodied in the medium, for specifying a microprocessor, the computer readable program code comprising:
first program code for specifying a branch target address cache (BTAC), wherein each entry of the BTAC is configured to store branch prediction information and the BTAC is organized into multiple groups of N entries so that each group provides N entries for storing branch prediction information for N branch instructions per fetch quantum, wherein N is a constant integer value, N is at least two, and branch instructions are classified with replacement priorities that are based on branch instruction type; and
second program code for specifying an execution unit, configured to execute a new branch instruction previously fetched from an instruction cache in a fetch quantum;
third program code for specifying an override indicator that regularly, approximately X of every Y clock cycles, provides an indication to force an update of the BTAC with branch information for a branch instruction, wherein Y is greater than X; and
fourth program code for specifying update logic, coupled to the BTAC and execution unit, configured to:
determine whether the BTAC is already storing branch prediction information for N branch instructions within the fetch quantum;
update the BTAC with branch information for the new branch instruction, if the BTAC is not already storing branch prediction information for N branch instructions within the fetch quantum;
determine whether the new branch instruction has a higher replacement priority, based on its type, than the branch instructions whose branch prediction information are already stored in the BTAC, if the BTAC is already storing branch prediction information for N branch instructions within the fetch quantum; and
update the BTAC with branch information for the new branch instruction, if the new branch instruction has a higher replacement priority, based on its type, than the branch instructions whose branch prediction information are already stored in the BTAC; and forego updating the BTAC with branch information for the new branch instruction, if the new branch instruction does not have a higher replacement priority, based on its type, than the branch instructions whose prediction information are already stored in the BTAC, unless the override indicator provides an override indication to force an update of the BTAC.

\* \* \* \* \*